M. T. CLAY.
CORN HARVESTING AND SHOCKING MACHINE.
APPLICATION FILED MAY 11, 1914.

1,176,276.

Patented Mar. 21, 1916.
5 SHEETS—SHEET 1.

Witnesses
/s/ Brann
Henry T. Bright

Inventor
M. T. Clay
By Chandler & Chandler
Attorneys

M. T. CLAY.
CORN HARVESTING AND SHOCKING MACHINE.
APPLICATION FILED MAY 11, 1914.
1,176,276.
Patented Mar. 21, 1916.
5 SHEETS—SHEET 2.
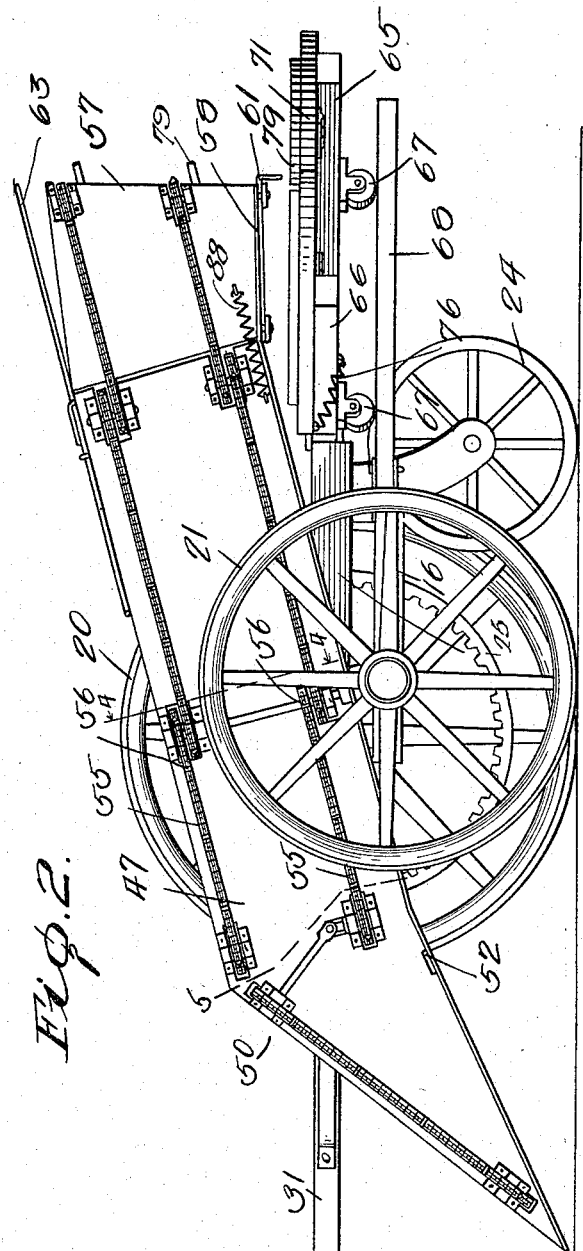
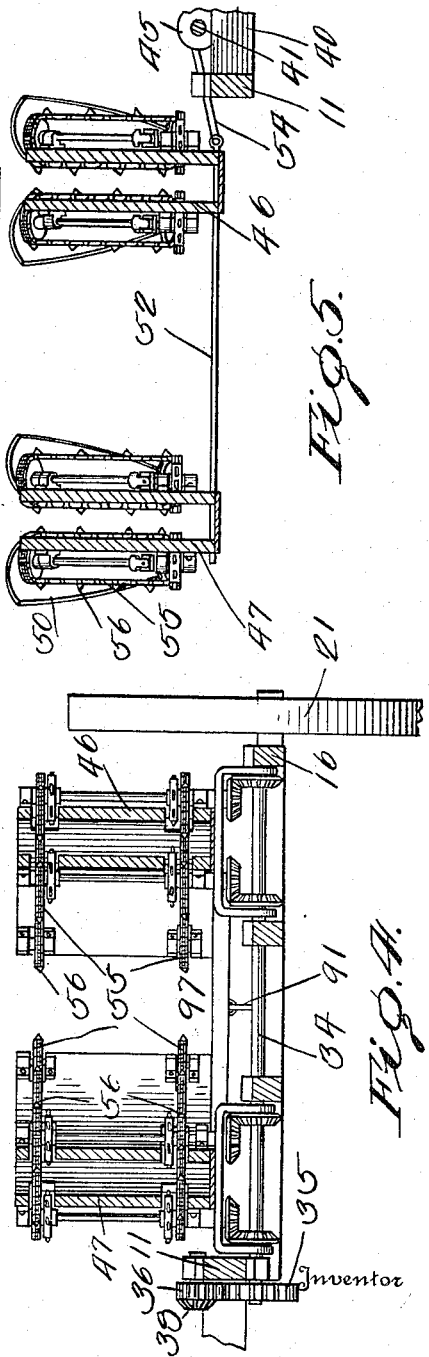
Witnesses
Inventor
M. T. Clay
By Chandler & Chandler
Attorneys M. T. CLAY.
CORN HARVESTING AND SHOCKING MACHINE.
APPLICATION FILED MAY 11, 1914.

1,176,276.

Patented Mar. 21, 1916.
5 SHEETS—SHEET 3.

Witnesses

Inventor
M. T. Clay
By
Attorneys

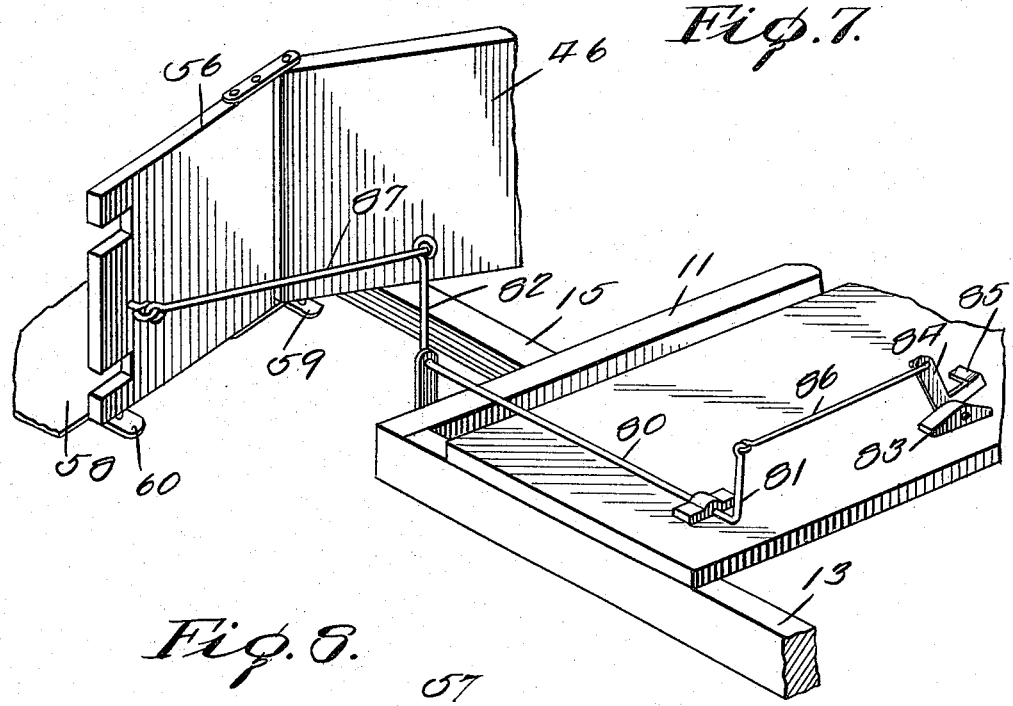
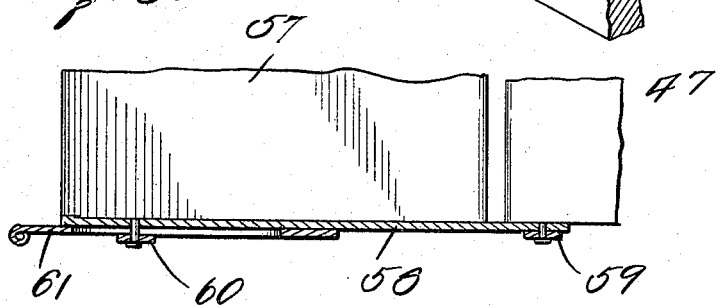

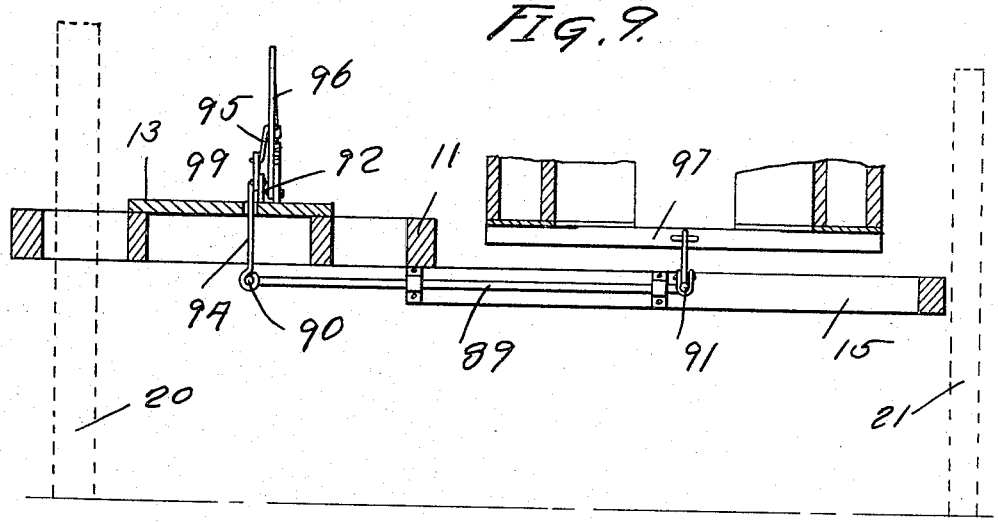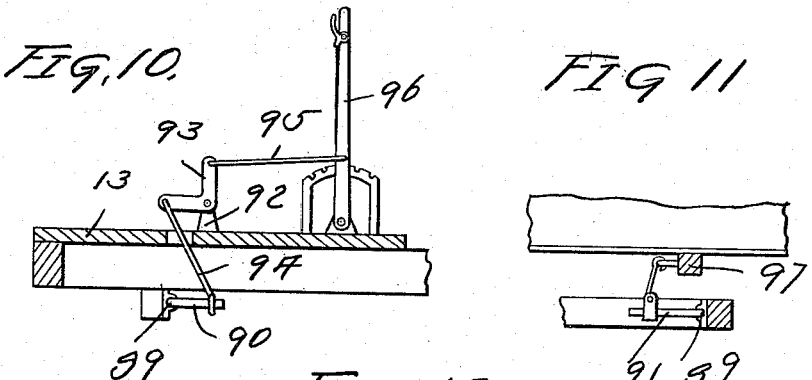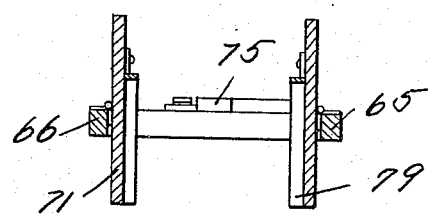

UNITED STATES PATENT OFFICE.

MINOR T. CLAY, OF PLEASANT LAKE, INDIANA.

CORN HARVESTING AND SHOCKING MACHINE.

1,176,276.   Specification of Letters Patent.   Patented Mar. 21, 1916.

Application filed May 11, 1914. Serial No. 837,852.

*To all whom it may concern:*

Be it known that I, MINOR T. CLAY, a citizen of the United States, residing at Pleasant Lake, in the county of Steuben, State of Indiana, have invented certain new and useful Improvements in Corn Harvesting and Shocking Machines; and I do hereby declare the following to be a full, clear, and exact description of the invention, such as will enable others skilled in the art to which it appertains to make and use the same.

This invention relates to corn harvesting and shocking machines.

The object of the invention resides in the provision of a corn harvesting and shocking machine which embodies the improved construction for effecting the gathering of the corn in the form of a shock, holding same in such form while being tied, and depositing the tied shock upon the ground at a point to one side of the line of the corn being harvested.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
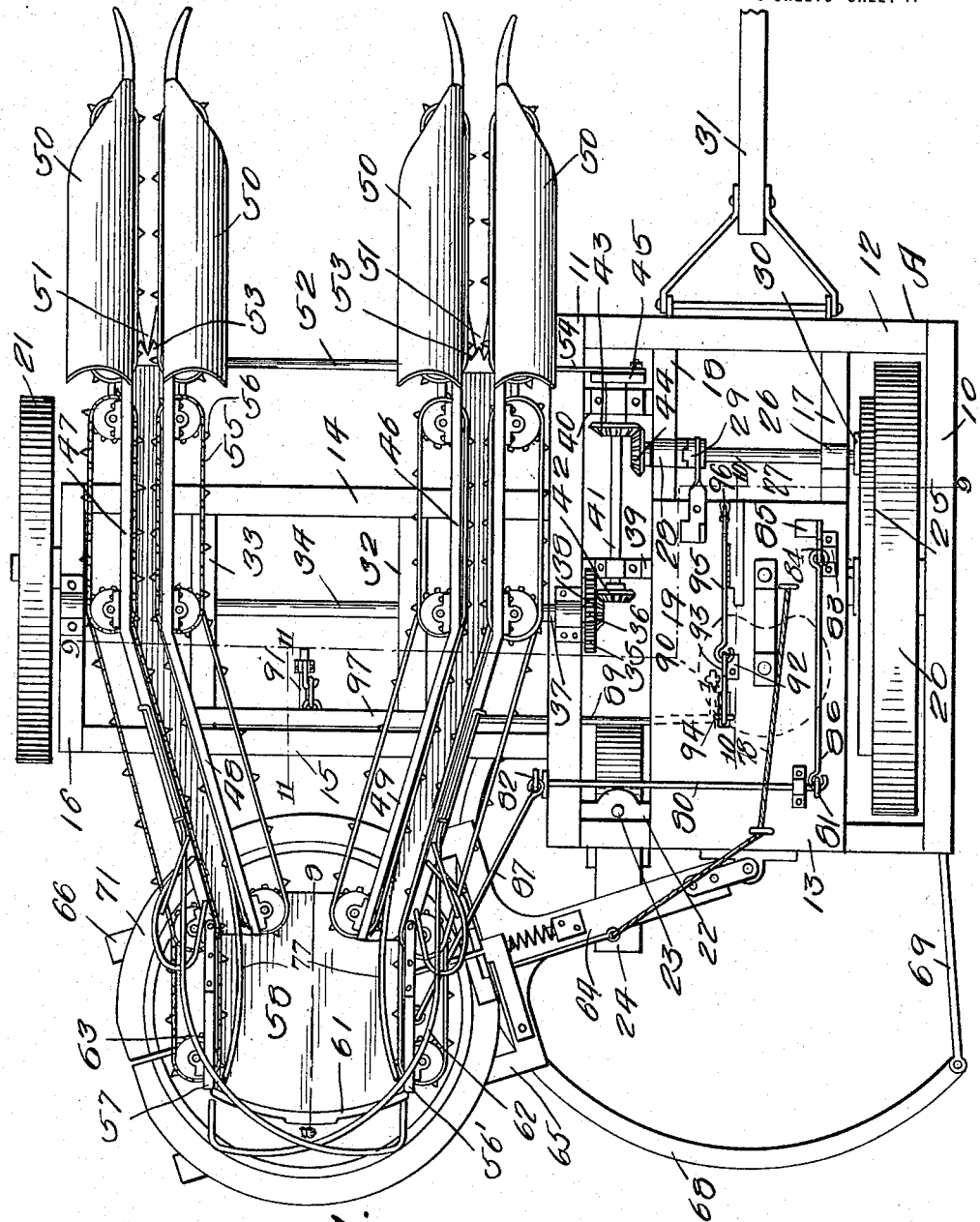
Figure 3:
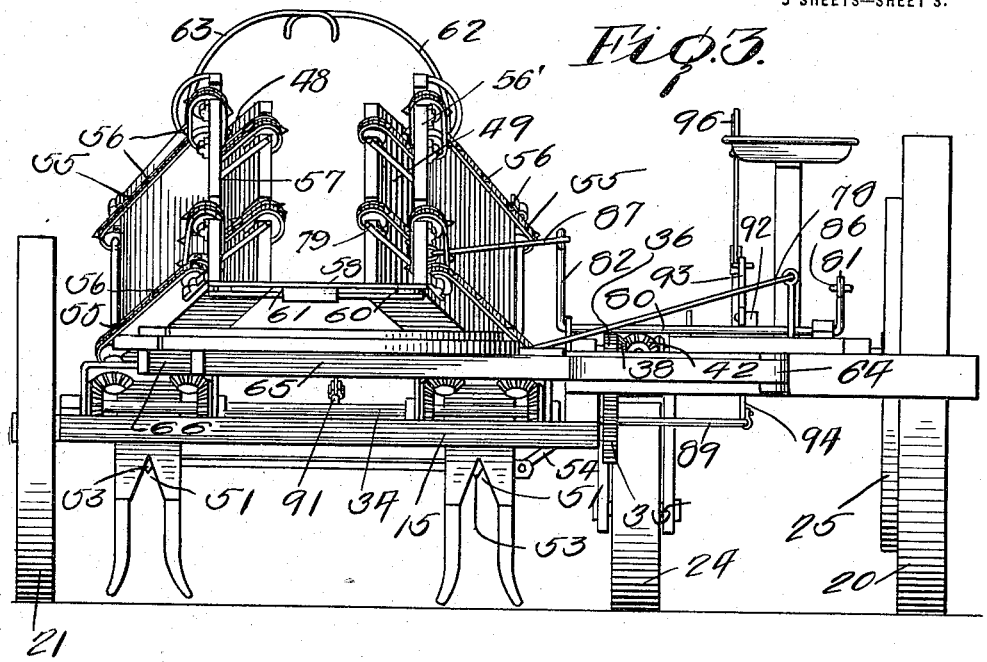
Figure 6:
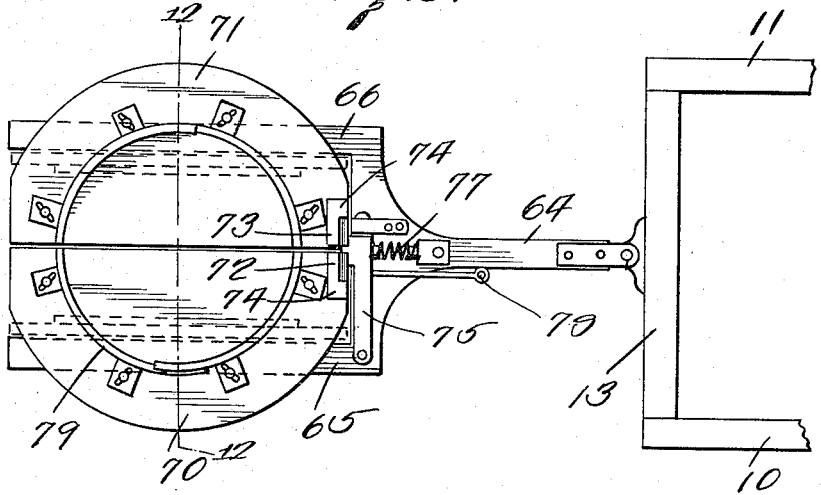

Figure 1 is a plan view of a corn harvesting and shocking machine constructed in accordance with the invention; Fig. 2, a side view of same; Fig. 3, a rear view of the invention; Fig. 4, a section on the line 4—4 of Fig. 2; Fig. 5, a section on the line 5—5 of Fig. 2; Fig. 6, a plan view of the mechanism utilized in delivering the shock upon the ground; Fig. 7, a perspective view showing the mechanism for swinging the common delivery mouth of the guide troughs; Fig. 8, a section on the line 8—8 of Fig. 1; Fig. 9, a section on the line 9—9 of Fig. 1; Fig. 10, a section on the line 10—10 of Fig. 1; Fig. 11, a section on the line 11—11 of Fig. 1, and Fig. 12, a section on the line 12—12 of Fig. 6 with the sections of the shock supporting platform in released position.

Referring to the drawings the invention is shown as comprising a main frame A which includes side members 10 and 11, a front member 12 and a rear member 13. Secured to and projecting laterally from the side member 11 are front and rear beams 14 and 15 respectively which are connected together at their outer ends by means of a beam 16. The front and rear members 12 and 13 of the frame A are connected together by means of longitudinal beams 17 and 18 supporting a platform 19. Journaled between the side member 10 and the longitudinal beam 17 is a traction wheel 20, while another traction wheel 21 is journaled upon the beam 16. Swiveled in a bearing 22 carried by the rear member 13 is a bracket 23 in which is rotatably mounted a guide wheel 24. Fixed on the inner side of the traction wheel 20 is an internal gear 25. Rotatably mounted in a bearing 26 carried by the longitudinal member 17 is a transverse shaft 27 which also rotates in a sleeve 28, said sleeve being rotatably supported by the longitudinal member 18. The sleeve 28 and shaft 27 are adapted to be connected for simultaneous rotation through the medium of a clutch 29. Fixed on the end of the shaft 27 remote from the sleeve 28 is a gear 30 which meshes with the gear 25. Secured to the front member 12 is a draft tongue 31. The front and rear beams 14 and 15 are connected together by intermediate members 32 and 33. Journaled in bearings carried by the side member 11, the intermediate members 32 and 33, and the beam 16 is a shaft 34 which has fixed on the end thereof adjacent the inner side of the side member 11 a gear 35 which meshes with a gear 36 fixed on a stub shaft 37 journaled upon the upper side of the side member 11. The outer end of the gear 36 terminates in a beveled gear 38 for a purpose that will presently appear. The longitudinal member 18 and the side member 11 are connected by cross beams 39 and 40 and journaled in bearings carried by these cross beams 39 and 40 is a shaft 41 which has fixed on its rear end a beveled gear 42 meshing with the beveled gear 38. Fixed on the shaft 41 just at the rear of the cross beam 40 is a beveled gear 43 which meshes with a beveled gear 44 fixed on the sleeve 28. Fixed on the extreme forward end of the shaft 41 is a disk 45 for a purpose that will presently appear. Pivotally mounted upon the shaft 34 are troughs 46 and 47 having their rear portions converging as at 48 and 49. The forward ends of the sides of the troughs 46 and 47 are inclined and have mounted thereon the usual gathering plates 50.

The bottoms of the troughs 46 and 47 terminate some distance inwardly of the extreme forward ends of the sides of the troughs and are provided respectively with V-shaped recesses 51. Slidably engaged through the side members of the troughs 46 and 47 and movable across the bottoms of said troughs at the inner ends of the recesses 51 is a bar 52 having the terminal portions thereof which work over the bottoms of the troughs provided with cutting teeth 53. The end of the bar 52 adjacent the side member 11 is connected to one end of a pitman 54, the other end of said pitman being eccentrically connected to the disk 45 whereby the rotation of the shaft 41 will effect a reciprocation of the bar 52 so that the teeth 53 will sever the corn as same moves into the recesses 51.

Suitably mounted upon the side members of the troughs 46 and 47 are a plurality of endless chains 55 provided with prongs 56, the rearwardly moving portions of said chains being disposed within the troughs 46 and 47 whereby the severed corn will be fed toward the rear of the trough. These chains 55 are driven through the medium of suitable connections with the shaft 34.

The outer sides of the troughs 46 and 47 include hinged rear portions 56' and 57 respectively and disposed between these hinged portions 56' and 57 is a plate 58 having bars 59 and 60 pivoted against the under side thereof. The terminals of the bar 59 are pivotally connected respectively to the lower edges of the outer sides of the troughs 46 and 47 just inward of the inner end of the hinged portions 56' and 57, while the terminals of the bar 60 are pivotally connected to the lower edges of the hinged portions 56' and 57 respectively. Slidably connected to the under side of the plate 58 is an extension plate 61 which serves as a support for the shock during the formation thereof as will hereinafter appear. Slidably mounted upon the upper edges of the outer sides of the troughs 46 and 47 are holding rods 62 and 63 respectively which serve to secure the shock in compact form during the formation thereof, said rods being capable of rearward movement in response to the increased size of the shock. The rods 62 and 63 are also capable of being rotated to dispose their curved rear ends in substantially vertical planes to permit movement of a completed shock from between said rods.

Pivoted on the rear member 13 is a bar 64 the outer end of which terminates in a U-shaped portion including arms 65 and 66. Journaled on the under side of the U-shaped portion of the bar 64 are rollers 67 which travel on a segmental track 68 having one end supported by bracket arm 69 extending from the frame A and its other end secured to the beam 15. Pivoted on the arms 65 and 66 are segmental sections 70 and 71 respectively of a shock supporting platform. These sections 70 and 71 are provided at their inner ends with recesses 72 and 73 respectively and mounted upon said sections are projections 74 which extend over the recesses 72 and 73 for a purpose that will presently appear. Pivoted on the U-shaped portion of the bar 64 is a latch 75 which is adapted to engage in the recesses 72 and 73 beneath the projections 74 for the purpose of holding the sections 70 and 71 in horizontal position against the influence of the weight of a shock disposed upon the sections. When no weight is disposed upon the sections 70 and 71 they are normally held in horizontal position by means of springs 76 having corresponding ends secured to the outer portion of respective sections and their other ends secured to the arms 65 and 66 respectively.

The latch 75 is normally held in locking position by a spring 77 and is adapted to be moved to release the inner edges of the sections 70 and 71 for downward movement through the medium of a pull cable 78. Adjustably mounted on the sections 70 and 71 are forming segments 79 which serve to properly shape the lower end of the shock as same is fed upon the sections 70 and 71 from the troughs 46 and 47. Journaled in bearings mounted upon the platform 19 and side member 11 is a shaft 80 provided at its terminals with crank arms 81 and 82 respectively. Pivoted upon a bracket 83 mounted upon the platform 19 is an angle lever 84 one arm of which is provided with a foot pedal, while the other arm thereof is connected to the crank arm 81 by a link 86. The crank arm 82 of the shaft 80 is connected to the hinged portion 56' by a link 87 whereby said hinged portions 56' and 57 may be swung laterally against the influence of a spring 88 connecting the hinged portion 57 to the outer side of the trough 47. These hinged portions 56' and 57 are swung laterally for the purpose of evenly distributing the corn upon the sections 70 and 71 when the latter are disposed in receiving position at the rear ends of the troughs 46 and 47. When a complete shock has been deposited upon the sections 70 and 71 the bar 64 is swung on its pivot until same alines with the frame A when the cable 78 is pulled to release the sections 70 and 71 and discharge the shock upon the ground.

Journaled in suitable brackets carried by the beam 15 and the side member 11 is a shaft 89 having its terminals provided with crank arms 90 and 91. Pivoted on a bracket 92 carried by the platform 19 is an angle lever 93 one arm of which is connected to the crank arm 90 by a link 94, while the other arm thereof is connected by a link 95 to an operating lever 96 mounted upon the platform 19. The troughs 46 and 47 have their bottom portions connected by a beam 97 which extends over the crank arm 91. By this construction it will be apparent that when the lever 96 is moved forward the shaft 89 will be rotated so that the crank arm 91 will engage the beam 97 and elevate the rear ends of the troughs 46 and 47. In this way the forward ends of the troughs may be maintained in proper relation to the corn being cut.

When the operation of the machine is instituted the extension 61 is positioned at the limit of its rearward movement and the shock as formed will seat upon this extension. During the forming of the shock the holding rods 62 and 63 will gradually slide to the rear. When the shock has reached a sufficient size it is bound by the operator and the platform including the sections 70 and 71 is swung beneath the section 61. The arms 62 and 63 are then rotated to move same out of engagement with the shock. The extension 61 is then pushed to its limit forwardly from beneath the shock when the latter will fall upon the sections 70 and 71. The platform formed by these sections is then swung manually toward the opposite side of the machine and when the same reaches the desired position the cable 78 is pulled manually to release the sections 70 and 71 and thereby allow the shock to fall upon the ground. The machine then moves forward and gathers another shock, the operation previously described being repeated.

The lever 96 is operated or adjusted to properly position the forward end of the cutting mechanism as will be apparent.

What is claimed is:—

1. In a corn harvesting and shocking machine, the combination of a wheeled frame, a pair of pivoted troughs mounted on the frame, cutting means at the forward end of each trough for severing the corn entering the trough, means for moving the severed corn rearwardly in the troughs, holding arms slidably and rotatably mounted on the troughs respectively and extending rearwardly thereof and adapted to be moved longitudinally under the influence of the forming shock therebetween, said arms being disengageable from the shock by rotation thereof, and manually operated means for moving the formed shock laterally of the machine, and means for discharging the shock upon the ground.

2. In a corn harvesting and shocking machine, the combination of a wheeled frame, a pair of pivoted troughs mounted on the frame, cutting means at the forward end of each trough for severing the corn entering the trough, means for moving the severed corn rearwardly in the trough, a sliding platform for supporting the shock during formation, a swinging platform movable beneath the sliding platform and adapted to receive the shock when the sliding platform is shifted from beneath same, and means for discharging the shock from the pivoted platform.

In testimony whereof, I affix my signature, in the presence of two witnesses.

MINOR T. CLAY.

Witnesses:
GEORGE J. WEAVER,
FLORENCE A. MASON.

Copies of this patent may be obtained for five cents each, by addressing the "Commissioner of Patents, Washington, D. C."